United States Patent
van den Berg

(10) Patent No.: US 6,598,560 B1
(45) Date of Patent: Jul. 29, 2003

(54) IMPLEMENT FOR MILKING ANIMALS, SUCH AS COWS

(75) Inventor: Karel van den Berg, Bleskensgraaf (NL)

(73) Assignee: Lely Research Holding AG (CH)

( * ) Notice: Subject to any disclaimer, the term of this patent is extended or adjusted under 35 U.S.C. 154(b) by 0 days.

(21) Appl. No.: 09/798,978

(22) Filed: Mar. 6, 2001

Related U.S. Application Data

(63) Continuation of application No. PCT/NL00/00324, filed on May 16, 2000.

(30) Foreign Application Priority Data

Jul. 7, 1999 (NL) .............................................. 1012529

(51) Int. Cl.[7] ................................ A01J 3/00; A01J 5/00
(52) U.S. Cl. .................................. 119/14.08; 119/14.14
(58) Field of Search ........................... 119/14.08, 14.14, 119/14.18

(56) References Cited

U.S. PATENT DOCUMENTS 4,064,838 A * 12/1977 Mukarovsky et al. .... 119/14.14
5,697,324 A * 12/1997 van der Lely ........... 119/14.08
5,718,186 A * 2/1998 van der Lely ........... 119/14.08
6,118,118 A * 9/2000 van der Lely et al. .... 119/14.08
6,167,838 B1 * 1/2001 van den Berg .......... 119/14.08
6,378,455 B1 * 4/2002 Postma et al. .......... 119/14.08

* cited by examiner

Primary Examiner—Charles T. Jordan
Assistant Examiner—Elizabeth Shaw
(74) Attorney, Agent, or Firm—Penrose Lucas Albright

(57) ABSTRACT

This invention relates to an Apparatus for milking animals, such as cows, and comprising a milking machine with teat cups and sensors which govern the milking process, examine the milk obtained and the physical condition of the animal being milked. The apparatus also includes a processing unit such as a computer for processing signals received from the sensors. The signals from the sensors are wirelessly transmitted via a transmitter to the processing unit. The sensors may be incorporated in each teat cup or only one teat cup. Energy for the sensors is generated by movements of magnets in coils, which are incorporated in each teat cup or in at least one of the feed cups, the movements of the magnets being provided by vacuum pulsations on each teat cup or one of the teat cups, or from another energy sources such as solar cells.

37 Claims, 3 Drawing Sheets

IMPLEMENT FOR MILKING ANIMALS, SUCH AS COWS

RELATED APPLICATION

This Application is a Continuation of International Application No. PCT/NL/00/00324, filed May 16, 2000, which is, it is submitted, an appropriate amendment. A marked-up copy of the original Specification of the invention is also submitted for comparison purposes.

FIELD OF THE INVENTION

The invention relates to an apparatus for milking animals, such as cows, comprising a milking machine with teat cups and at least one sensor for governing the milking process, examining the milk obtained, or examining the physical condition of the animal, or any combination thereof. The apparatus is also provided with a processing unit for processing the signal supplied by the sensor, said signal being transmitted via a wireless connection to a receiver which is connected to the processing unit.

BACKGROUND OF THE INVENTION

An apparatus of the type described above is known from the Dutch Patent 1,007,266.

In such apparatus, the sensor is disposed in the milk line. This has the disadvantage that the sensor does not come into contact with the animal, and moreover, there is a delay before the sensor comes into contact with the milk and is capable of making the desired measurements.

An object of the invention is to provide an apparatus in which the above-mentioned drawbacks do not occur or are at least minimized.

In accordance with the invention this is achieved in that the sensor is disposed in or on the teat cup or both. By so disposing the sensor it is possible to collect data regarding the milking process or the quality of the milk or the physical condition of the animal after the teat cup has been connected to the teat, or immediately after the milk flow has started or any combination thereof.

The sensor or the teat cup or both may also be provided with a processing unit. In such a case the processing unit, which is connected to the receiver, will comprise a printer or a display or both.

According to again another inventive feature, the processing unit is connected to a transmitter with the aid of which a signal is transmitted to the sensor in a wireless manner.

In accordance with an inventive feature, the wireless connection comprises a transmitter which is disposed on or in the milking machine or in both locations. According to another aspect of the invention, the transmitter is disposed near the lower side of the teat cup. According to again another inventive feature, the transmitter is constituted by an infrared transmitter or an ultrasonic or a radiographic or an optical transmitter. For the purpose of supplying the transmitter with energy, the transmitter is connected to an energy source which, according to an inventive feature, is also charged by a wireless connection. This connection has the same advantages as the wireless connection of the sensor. According to an inventive feature, more in particular, the wireless connection is achieved by means of an electromagnetic field. In an embodiment of the invention, the wireless connection is constituted by two coils. According to a further aspect of the invention, the coils constitute a transmitter or a receiver for the wireless connection. It is farther possible to charge the energy source with the aid of solar cells.

According to another inventive feature, the transmitter is connected, directly or indirectly, via an energy source, to a device for generating electrical energy, whereby, as a result of changes in air pressure or gas pressure, a body, such as a magnet, is caused to move, and, using said motion, electrical energy is generated in an electromagnetic manner.

According to a further inventive feature, the body is disposed in the pulsation chamber or milk chamber or both of the teat cup.

According to another inventive feature, the body is connected directly or indirectly to a liner of the teat cup.

According to a further inventive feature, the lower part of the teat cup is tapering, and the apparatus also comprises a carrier having a recess which corresponds to the tapering lower side of the teat cup. In the inoperative position, the teat cup is retained on the carrier with the aid of a withdrawal member that comprises a cord which has one end connected to the lower side of the teat cup and the other end to a control piston and cylinder component.

For the purpose of facilitating the reading of signals received by the sensor, according to an inventive feature, the receiver of the wireless connection is disposed in the vicinity of the transmitter. According to another inventive feature, the receiver is disposed in or on the carrier of the teat cup.

In accordance with an inventive feature, the sensor makes the following measurements as well as others the temperature of the milk, the conductivity of the milk, the cell count or the germ count of the milk, the presence or absence of the teat in the teat cup or the vacuum level in the teat cup, the blood pressure of the animal, the heart beat of the animal, the internal pressure in the teat or movements of the teat cups liner.

According to an inventive feature, a mass inertia sensor is disposed in or on the teat cup or at both locations.

In accordance with an inventive feature, the signal supplied by the mass inertia sensor is transmitted to a processing unit in a wireless manner or via a fixed connection, such as, for example, an electric wire or optical fiber, or via contact surfaces.

According to a further inventive feature, if the mass inertia sensor signals that a teat cup has fallen from a teat, the processing unit emits a further signal that causes the vacuum in the teat cup to be removed.

According to again another inventive feature, if the mass inertia sensor signals that a teat cup has fallen from a teat, the processing unit emits a further signal which causes the relevant teat cup to be automatically reconnected to the teat.

According to a further inventive feature, the apparatus comprises a milking robot having a robot arm with the aid of which the teat cups are automatically connected to the teats of the animal to be milked. According to again another aspect of the invention, the processing unit comprises a computer.

BRIEF DESCRIPTION OF THE DRAWINGS

The invention will now be explained in further detail with reference to the accompanying drawings in which.

DETAILED DESCRIPTION OF THE PREFERRED EMBODIMENTS

Figure 1:
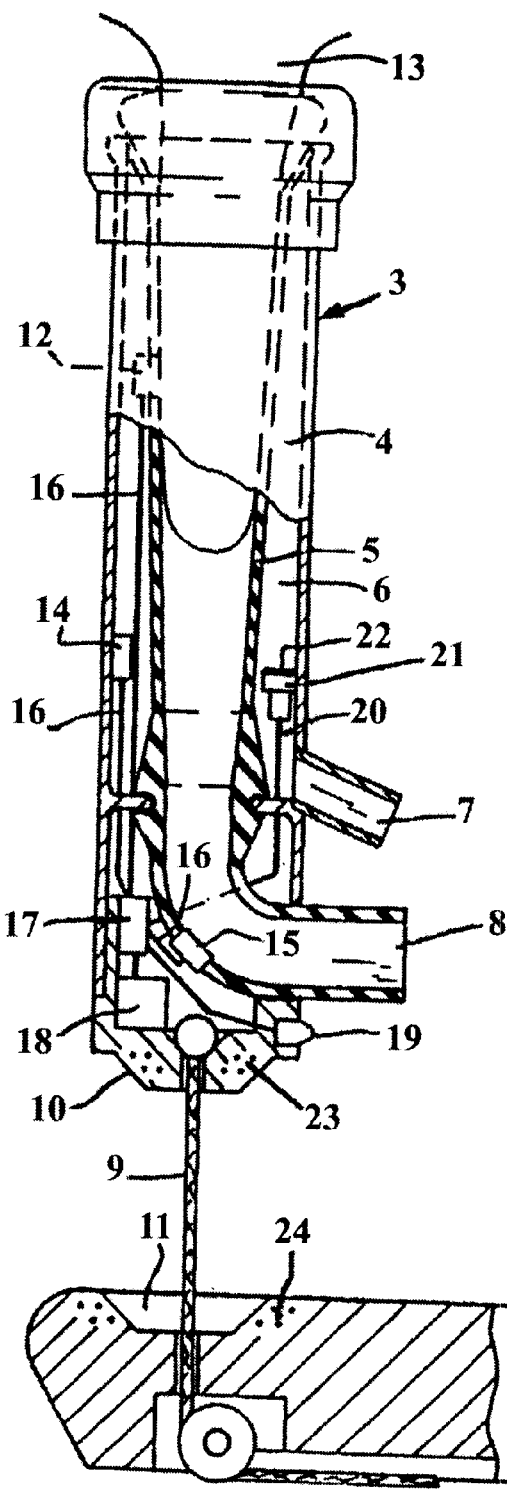
FIG. 1 shows in a partial sectional side elevational view part of a milking robot arm with a teat cup that is provided with sensors which are connected to a transmitter that is capable of exchanging data with a receiver via a wireless connection.
Figure 1:
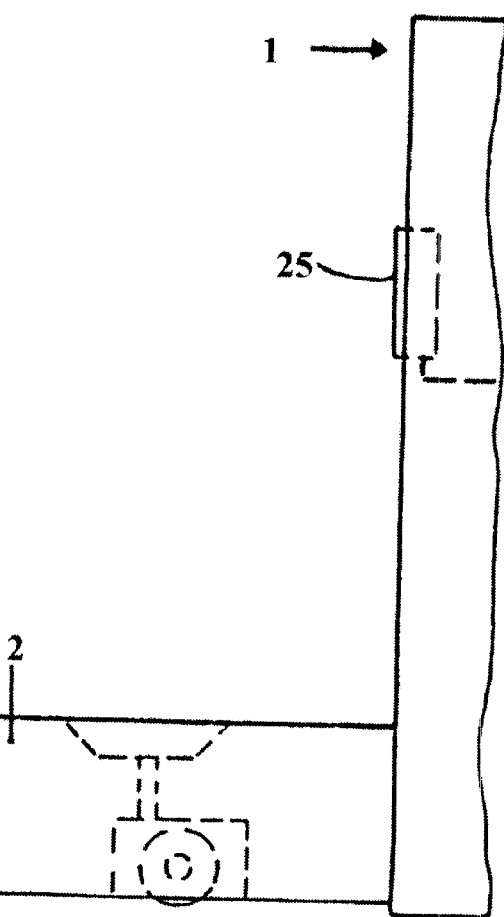

FIG. 1 shows part of a robot arm construction 1 of a milking robot. Robot arm construction 1 comprises a carrier 2 for carrying teat cups 3. In the exemplary embodiment only one teat cup 3 is depicted. However, depending on the kind of animal being milked, two or more teat cups may be carried by carrier 2. Teat cup 3 comprises an outer casing 4 and a flexible liner 5. Between outer casing 4 and teat cup liner 5 is a pulsation chamber 6 in which a vacuum and an atmospheric pressure are alternately applied. A pulse tube 7 is connected to pulsation chamber 6. Near the lower side of teat cup 3, a milk tube 8 is further connected to teat cup 3. By means of a cord 9, which has one side connected to teat cup 3 and the other side to a control piston and cylinder component, teat cup 3 can be drawn against carrier 2. Near its lower side teat cup 3 has a tapering part 10, which corresponds to a tapering recess 11 in carrier 2. When teat cup 3 is drawn onto carrier 2 by means of cord 9, teat cup 3 moves into a predetermined position as a result of tapering parts 10 and 11. Near the upper side of teat cup liner 5 a first sensor 12 is disposed with the aid of which it can be determined whether or not teat cup 3 is connected to a teat 13. First sensor 12 may also be a temperature sensor. Further included in pulsation chamber 6 is a second sensor 14 with the aid of which the vacuum level in pulsation chamber 6 can be measured. In addition, near the lower side of teat cup liner 5 a third sensor 15 is provided with the aid of which the conductivity of milk therein is determined. First, second and third sensors 12, 14 and 15 are connected to a transmitter 17 via wires 16. Transmitter 17 is connected to an accumulator 18. Transmitter 17 is further provided with a transmitter element 19 which is disposed near the lower side of teat cup 3. Transmitter 17, accumulator 18 and transmitter element 19 are embedded in the material of which the lower side of teat cup 3 is made. This has the advantage that transmitter 17, accumulator 18 and transmitter element 19 are less vulnerable. Via a wire 20, transmitter 17 is further connected to a device 21 for generating energy. As a result of alternating difference in pressure in pulsation chamber 6, device 21 is capable of generating electrical energy. For that purpose device 21 comprises a membrane 22 which is reciprocated under the influence of alternating differences in pressure. A magnet is connected to membrane 22 which reciprocates in a coil. In the lower, tapering part 10 of teat cup 3 there is further embedded a first coil 23 which connects with accumulator 18. Around tapering recess 11 in carrier 2 a second coil 24 is disposed which is connected to an energy source. When teat cup 3 is drawn onto carrier 2, accumulator 18 can be charged in a wireless manner via coils 23 and 24. Robot arm construction 1 is further provided with a receiver 25 which connects to a processing unit. During or after milking or at both times, measurement data measured by the sensors are transmitted to the receiver 25 in a wireless manner via transmitter element 19. Thus the milking process, the examination of the milk obtained or the examination of the physical condition of the animal, or any combination thereof, are supervised in a proper manner.

Figure 2:
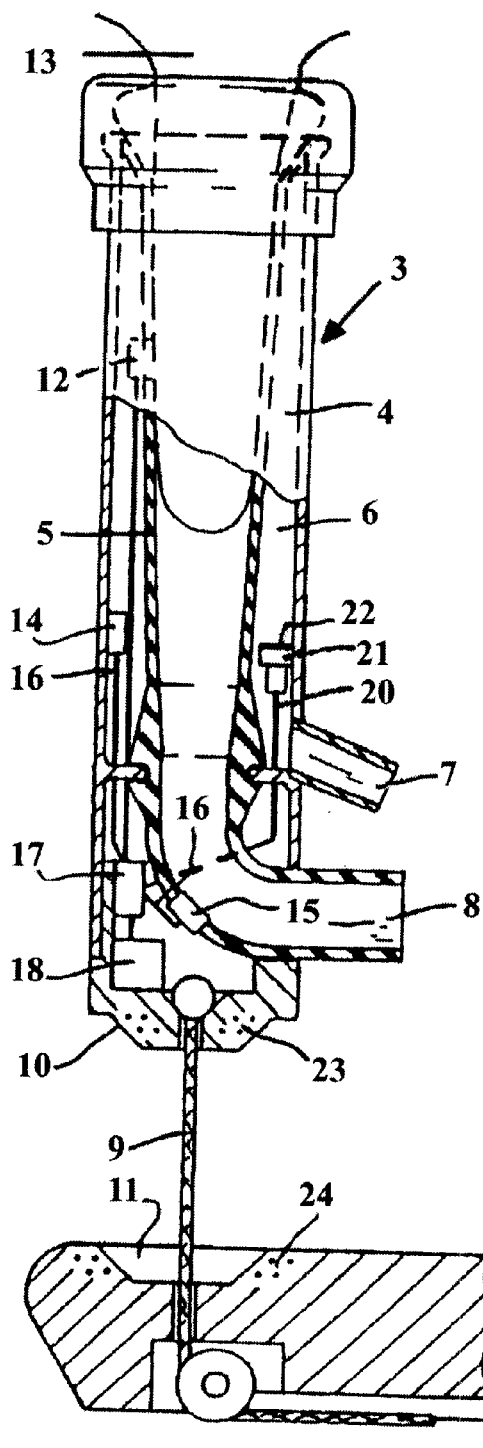
FIG. 2 is a partial sectional side elevational view similar to FIG. 1, which shows a second embodiment of a wireless connection.

FIG. 2 shows a second embodiment of the invention, in which parts corresponding to those of the first embodiment are indicated by the same reference numerals. In the second embodiment of the invention, the wireless connection is constituted by the first and second coils 23 and 24. Coils 23 and 24 may function both as transmitters and as receivers.

Figure 3:
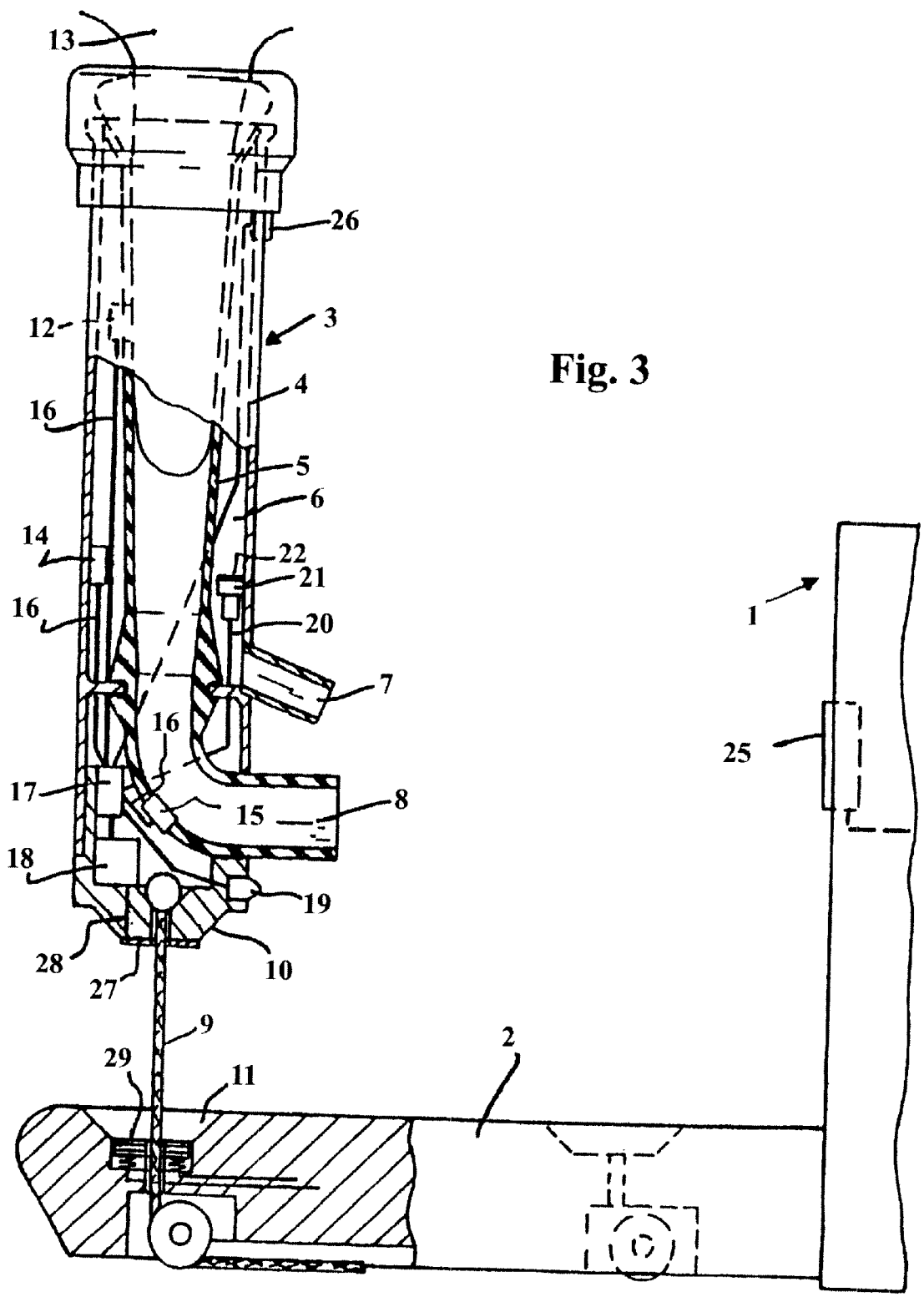
FIG. 3 is a further partial sectional side elevational view of the invention which shows a teat cup with a mass inertia sensor.

FIG. 3 shows a third embodiment of the invention, in which teat cup 3 include a mass inertia sensor 26 which provides a signal if teat cup 3 falls from teat 13. If teat cup 3 has fallen from teat 13, vacuum in teat cup 3 is removed and teat cup is drawn to carrier 2 by cord 9, whereupon teat cup 3 is thereafter connected again to teat 13 by means of robot arm construction 1. The lower side of teat cup 3 shown in FIG. 3 is further provided with a first contact surface 27 which is connected to accumulator 18 via a wire 28. First contact surface 27 makes contact with a second contact surface 29 which is disposed on carrier 2. First and second contact surfaces 27 and 29 form part of a battery charger for accumulator 18. For the purpose of achieving a proper contact between first and second contact surfaces 27 and 29, second contact surface 29 is a resilient one, However, first contact surface 27 or both contact surfaces 27 and 29 may be resilient.

Although I have disclosed the preferred embodiments of my invention, it is to be understood that it is capable of other adaptations and modifications within the scope of the following claims.

What is claimed is:

1. An apparatus for milking animals which comprises: a milking machine which includes a teat cup; a sensor in said teat cup, said sensor sensing and supplying signals for at least one of the following: the physical condition of the animal being milked, the milking process, and the milk flowing through said teat cup; a processing unit for processing said signals which are supplied by said sensor; a receiver and a wireless connection between said receiver and said sensor, whereby said receiver receives said signals from said sensor which are transmitted via said wireless connection for processing by said processing unit.

2. An apparatus in accordance with claim 1 which comprises a transmitter, said signals being transmitted from said sensor to said transmitter.

3. An apparatus in accordance with claim 2 wherein said transmitter is disposed on said milking machine.

4. An apparatus in accordance with claim 3, wherein said transmitter is disposed on said teat cup.

5. An implement in accordance with claim 4 wherein said transmitter is disposed proximate a lower side of said teat cup.

6. An apparatus in accordance with claim 2 wherein said transmitter comprises an infrared transmitter.

7. An apparatus in accordance with claim 2 wherein said transmitter comprises an ultrasonic transmitter.

8. An apparatus in accordance with claim 2 wherein said transmitter comprises a radiographic transmitter.

9. An apparatus in accordance with claim 2 wherein said transmitter comprises an optical transmitter.

10. An apparatus in accordance with claim 2 further comprising an energy source, said transmitter being connected to said energy source, said energy source being energized via a further wireless connection.

11. An apparatus in accordance with claim 1 wherein said teat cup has a tapering lower part.

12. An apparatus in accordance with claim 1 which comprises a transmitter which is connected to said sensor, said receiver being disposed in the vicinity of said transmitter.

13. An apparatus in accordance with claim 1 wherein said sensor measures at least one of the following: the temperature of the milk, the conductivity of the milk, the cell count of the milk, the germ count of the milk, the presence or absence of the animal's teat in said teat cup, the vacuum level in said teat cup, the blood pressure of the animal being milked, the heart beat of the animal being milked, the internal pressure in the teat of the animal being milked, and the movements of a liner of said teat cup.

14. An apparatus in accordance with claim 1 wherein said teat cup includes a mass inertia sensor.

15. An apparatus in accordance with claim 1 which comprises a milking robot having a robot arm with the aid of which said one teat cup is automatically connected to a teat of the animal to be milked.

16. An apparatus in accordance with claim 1 wherein said processing unit comprises a computer.

17. An apparatus for milking animals which comprises a milking machine which includes teat cups, at least one of said teat cups including a mass inertia sensor.

18. An apparatus in accordance with claim 17 which comprises a processing unit, said mass inertia sensor supplying a signal to said processing unit via a fixed connection.

19. An apparatus in accordance with claim 18 wherein said fixed connection comprises an electric wire.

20. An apparatus in accordance with claim 18 wherein said fixed connection comprises an optical fiber.

21. An apparatus in accordance with claim 18 wherein said fixed connection comprises contact surfaces.

22. An apparatus in accordance with claim 17, comprising a processing unit, said mass inertia sensor supplying signals which are transmitted to said processing unit in a wireless manner.

23. An apparatus for milking animals which comprises a milking machine, including teat cups, a sensor for performing at least one of the following functions: supervising of the milking process, examining the milk obtained in the milking process, examining the physical condition of the animal being milked, or any combination of such functions; a processing unit for processing a signal supplied by said sensor, a transmitter for transmitting via a wireless connection said signal to a receiver which is connected to said processing unit, said sensor comprising a part of said teat cup.

24. An apparatus for milking animals which comprises a milking machine which includes a teat cup; a sensor in said teat cup, said sensor sensing and supplying signals for at least one of the following: the physical condition of the animal being milked, the milking process, and the milk flowing through said teat cup; a transmitter disposed on the lower part of said teat cup for transmitting signals from said sensor; a processing unit for processing said signals which are supplied by said sensor to said transmitter; a receiver and a wireless connection between said receiver and said transmitter, whereby said receiver receives said signals from said sensor which are transmitted via said transmitter and said wireless connection for processing by said processing unit.

25. An apparatus for milking animals which comprises: a milking machine which includes at teat cup; a sensor in said teat cup; said sensor sensing and supplying signals for at least one of the following: the physical condition of the animal being milked, the milking process, and the milk flowing through said teat cup; a processing unit for processing said signals which are supplied by said sensor; a receiver and a wireless connection between said receiver and said sensor, whereby said receiver receives said signals from said sensor which are transmitted via said wireless connection for processing by said processing unit; a transmitter, said signals being transmitted from said sensor to said transmitter; and an energy source, said transmitter being connected to said energy source, said energy source being energized via a further wireless connection which comprises an electromagnetic field.

26. An apparatus in accordance with claim 15, wherein said further wireless connection comprises two coils.

27. An apparatus in accordance with claim 26, wherein said two coils comprise a transmitter coil and a receiver coil.

28. An apparatus for milking animals which comprises a milking machine which includes a teat cup; a sensor in said teat cup; said sensor sensing and supplying signals via a transmitter for at least one of the following: the physical condition of the animal being milked, the milking process, and the milk flowing through said teat cup; a processing unit for processing said signals which are supplied by said sensor; a receiver; and a wireless connection between said receiver and said transmitter, whereby said receiver receives said signals from said sensor which are transmitted by said transmitter via said wireless connection for processing by said processing unit; and an energy source to which said transmitter is connected, said energy source comprising a body which produces electrical energy by electromagnetic phenomena.

29. An apparatus in accordance with claim 28, wherein said body is disposed in a pulsation chamber, of said teat cup.

30. An apparatus in accordance with claim 28, wherein said body is disposed in a milk chamber of said teat cup.

31. An apparatus in accordance with claim 28, wherein said body is connected directly to a liner of said teat cup.

32. An apparatus in accordance with claim 28, wherein said body is interconnected to a liner of said teat cup.

33. An apparatus for milking animals which comprises: a milking machine which includes a teat cup; a sensor in said teat cup, said sensor sensing and supplying signals for at least one of the following: the physical condition of the animal being milked, the milking process, and the milk flowing through said teat cup; a processing unit for processing said signals which are supplied by said sensor; a receiver and a wireless connection between said receiver and said sensor, whereby said receiver receives said signals from said sensor which are transmitted via said wireless connection for processing by said processing unit; an energy source for providing energy to said sensor, said energy source comprising a solar cell.

34. An apparatus for milking animal which comprises: a milking machine which includes a teat cup; a sensor in said teat cup, said sensor sensing and supplying signals for at least one of the following: the physical condition of the animal being milked, the milking process, and the milk flowing through said teat cup; a processing unit for processing said signals which are supplied by said sensor; a receiver and a wireless connection between said receiver and said sensor, whereby said receiver receives said signals from said sensor which are transmitted via said wireless connection for processing by said processing unit; and a carrier for said teat cup, said teat cup being detachably disposed in said carrier.

35. An apparatus for milking animals which comprises: a milking machine which includes a teat cup; a sensor in said teat cup, said sensor sensing and supplying signals for at least one of the following: the physical condition of the animal being milked, the milking process, and the milk flowing through said teat cup; a processing unit for processing said signals which are supplied by said sensor; a receiver and a wireless connection between said receiver and said sensor, whereby said receiver receives said signals from said sensor which are transmitted via said wireless connection for processing by said processing unit; a transmitter which is connected to said sensor, said receiver being disposed in the vicinity of said transmitter; and a carrier for said teat cup, said receiver being disposed on said carrier.

36. An apparatus for milking animals which comprises a milking machine which includes teat cups, at least one of said teat cups including a mass inertia sensor; a processing unit, said mass inertia sensor supplying a signal to said processing unit via a fixed connection; vacuum producing means connected to said teat cup which is provided with said mass inertia sensor, said mass inertia sensor including means for transmitting a signal to said processing unit when said one teat cup has fallen from a teat, vacuum securing means for removing vacuum from said vacuum producing means in said one teat cup, said processing unit including means for activating said vacuum securing means and removing vacuum from said one teat cup in response to said signal from said mass inertia sensor that said one teat cup has fallen from a teat.

37. An apparatus in accordance with claim 36, which comprises teat cup connection means which is activated to replace said one teat cup on a teat of the animal being milked when said mass inertia sensor signals that the relevant teat cup has fallen from the teat of the animal being milked.

* * * * *